Patented June 11, 1940

2,204,466

UNITED STATES PATENT OFFICE 2,204,466

MIXTURE APPLICABLE TO TIRES, FOOTWEAR OR THE LIKE TO PREVENT SKIDDING

Howard Turner Barnes, Montreal, Quebec, Canada, assignor to George F. Foss, Montreal, Quebec, Canada No Drawing. Application June 16, 1938, Serial No. 214,168. In Canada July 29, 1937

4 Claims. (Cl. 106—7.5)

This invention relates to a mixture applicable to tires, footwear and the like to prevent skidding.

Greasy and icy roads present a constant hazard in driving and many vehicle accidents result through these causes. Accidents and vehicle damage are particularly common in the winter through skidding on icy pavements or roads and while many attempts have been made to overcome this skidding tendency, all developments have seemed to be in the direction of particular tire tread formation or various anti-skid tire chain constructions. In the case of the former very indifferent success has been obtained, while in the latter those constructions which would serve to some extent to prevent skidding on ice, have been prohibited due to the damage done to roads and pavements, whereas those that are permitted have the tendency to increase the danger of skidding.

A great deal of inconvenience is also experienced during the winter when a motor vehicle is stalled on snow or ice. In some cases certain forms of tire tread have been helpful to avoid slipping and assist in getting the vehicle under momentum, but in most cases it is necessary to use tire chains to get out of these difficulties.

According to the present invention these hazards and disadvantages are largely avoided by providing a mixture which may be in powder or liquid form and which, when applied to tires and also to footwear, or the like, will have the effect of preventing slipping or skidding. The mixture is made up of several chemical ingredients, the preferred mixture including all the ingredients but advantageous results may be obtained by employing a combination of some of them.

It is difficult to know with accuracy all the functions that each ingredient performs. In general, however, the mixture employs an agent to prevent ice formation on the tires, footwear, etc., or in the pores of the tires, footwear, etc., an agent imparting adhesive properties to the mixture to retain it on the tires or footwear for a reasonable length of time, as well as giving an adhesive property to the tire or footwear. The mixture also preferably employs an agent for offsetting any detrimental effects of the two forementioned agents on the coated surfaces or adjacent surfaces, and also includes an abrasive or other substance that will act similarly to an abrasive.

The preferred mixture is a combination of calcium chloride, potash alum, powdered borax and powdered pumice. These are admixed in the following proportions:

| | Pounds |
|---|---|
| Calcium chloride | 100 |
| Potash alum | 10 |
| Powdered borax | 5 |
| Powdered pumice | 5 |

This may be prepared by mixing the potash alum, powdered borax and powdered pumice together and then thoroughly mixing this mixture with the calcium chloride.

This mixture is applied to vehicle tires, footwear, or the like, it being necessary that the tires, footwear or the like be wet and a preferred manner of applying this powdered mixture in the case of motor vehicles, is to sprinkle it on the garage floor so that as the car is driven in from the snow or wet ground, the tires will receive a substantial coating. Consequently, as the car is taken out of the garage again and used, the mixture which is thoroughly applied to the tires will function to eliminate skidding.

The mixture referred to can be put up in powder form or may be put up in a liquid form using, for instance, a suitable quantity of water to which the mixture may be introduced.

It will be noted that the preferred form of mixture includes a deliquescent salt, a water soluble salt of aluminium, an alkali metal salt of weak acid and an aluminium silicate mixture, which forms a light bulky abrasive. The calcium chloride or the deliquescent salt serves, during the winter, to prevent ice formation on the tires and in the pores of the tires. It is believed that its property of absorbing moisture with consequent generation of heat, accomplishes this result. The water soluble salt of aluminium, it is believed, functions to impart adhesive properties to the mixture so as to retain the mixture on the tires for a reasonable length of time, as well as imparting body to the mixture. The alkali metal salt of weak acid functions to offset any possible detrimental effects which the first two ingredients might have on the tires or the paint of the vehicle, whereas the silicate of aluminium mixture gives an abrasive action to assist materially in bringing the vehicle to a positive stop. Substitutes for at least three of these ingredients are no doubt available. For instance, in the case of the water soluble salt of aluminium, which includes potash alum, there might be employed in place of the latter, alum cake, ammonia alum, sodium alum or other water soluble aluminium salts. In the case of the powdered borax any alkali metal salt of a weak acid might be employed, whereas, in the case of the pumice, any suitable powdered abrasive might be employed.

It must be understood therefore that the invention is not confined to the preferred mixture as given specifically above, since some substitutes might be used and, on the other hand, exact proportions of the ingredients as given in the preferred mixture might be changed somewhat. Moreover, it is possible to obtain substantial results by employing a mixture which does not include all the ingredients, for instance, by employing the calcium chloride and alum, substantial results may be obtained. Likewise, by employing these ingredients together with the powdered borax, similar results may be obtained. However, by employing the complete mixture, including the ingredient that imparts an abrasive action, positive results are obtained.

The mixture when applied to tires will remain on the tires for a reasonable length of time. As a result of tests it has been found that at low temperatures in the winter the mixture will remain on the tires for approximately twenty-four hours, whereas, at higher temperatures, it will remain for approximately ten hours. The mixture is very easy to apply and as indicated may be applied in a very practical manner by sprinkling the powder on the garage floor, whereby the vehicle tires receive a coating each time the car is driven into the garage.

Various modifications may be made in this invention without departing from the spirit thereof or the scope of the claims, and therefore the exact forms shown are to be taken as illustrative only and not in a limiting sense, and it is desired that only such limitations shall be placed thereon as are disclosed in the prior art or are set forth in the accompanying claims.

What I claim is:

1. A mixture applicable to tires, footwear and the like to prevent skidding comprising calcium chloride, alum, and borax.

2. The mixture as claimed in claim 1 including an abrasive agent.

3. A mixture applicable to tires, footwear and the like to prevent skidding, comprising calcium chloride, alum, powdered borax and powdered pumice.

4. A mixture applicable to tires, footwear and the like to prevent skidding, comprising calcium chloride—approximately 100 pounds, alum—approximately 10 pounds, powdered borax—approximately 5 pounds and powdered pumice—approximately 5 pounds.

HOWARD TURNER BARNES.